(12) United States Patent
Ueno et al.

(10) Patent No.: US 11,611,269 B2
(45) Date of Patent: Mar. 21, 2023

(54) ROTOR AND ROTOR MANUFACTURING METHOD

(71) Applicants: KYB CORPORATION, Tokyo (JP); TOP CO., LTD., Fukui (JP)

(72) Inventors: Sayaka Ueno, Tokyo (JP); Hiroyuki Miyoshi, Fukui (JP); Masanobu Sunabata, Fukui (JP)

(73) Assignees: KYB Corporation, Tokyo (JP); TOP Co., Ltd., Fukui (JP)

( * ) Notice: Subject to any disclaimer, the term of this patent is extended or adjusted under 35 U.S.C. 154(b) by 265 days.

(21) Appl. No.: 16/701,624

(22) Filed: Dec. 3, 2019

(65) Prior Publication Data

US 2020/0195105 A1    Jun. 18, 2020

(30) Foreign Application Priority Data

Dec. 17, 2018 (JP) .............................. JP2018-235324

(51) Int. Cl.
*H02K 1/27* (2022.01)
*H02K 15/03* (2006.01)
*H02K 1/276* (2022.01)

(52) U.S. Cl.
CPC ........... *H02K 15/03* (2013.01); *H02K 1/2773* (2013.01); *H02K 2201/09* (2013.01)

(58) Field of Classification Search
CPC .. H02K 15/03; H02K 1/2773; H02K 2201/09; H02K 2201/06; H02K 1/278;
(Continued)

(56) References Cited

U.S. PATENT DOCUMENTS

| 2014/0210296 A1 | 7/2014 | Miyashita |
| 2017/0012510 A1 | 1/2017 | Hattori |
| 2020/0313478 A1* | 10/2020 | Mukai ................... H02K 1/276 |

FOREIGN PATENT DOCUMENTS

| CN | 106340984 A | 1/2017 |
| JP | S60-121943 A | 6/1985 |

(Continued)

OTHER PUBLICATIONS

Machine Translation, UEDA, JP-2007282358-A, Oct. 2007. (Year: 2007).*

(Continued)

*Primary Examiner* — Thomas Truong
(74) *Attorney, Agent, or Firm* — Paratus Law Group, PLLC

(57) ABSTRACT

The rotor includes a drive shaft, a first rotor core unit, and a second rotor core unit. The first rotor core unit is configured from a first iron core material having a through-hole into which the drive shaft is inserted, and a plurality of first permanent magnets, and includes a first reference surface at which the first iron core material is flush with or protruding further than first permanent magnets. The second rotor core unit is configured from a second iron core material having a through-hole into which the drive shaft is inserted, and a plurality of second permanent magnets, and has a second reference surface at which the second iron core material is flush with or protruding further than second permanent magnets, the second rotor core unit being laminated in an axial direction on the first rotor core unit such that the first reference surface and the second reference surface contact each other.

4 Claims, 13 Drawing Sheets

(58) Field of Classification Search
CPC .......... H02K 1/274; H02K 3/50; H02K 5/163; H02K 13/00
See application file for complete search history.

(56) References Cited

FOREIGN PATENT DOCUMENTS

| | | | | |
|---|---|---|---|---|
| JP | 2003-204649 A | 7/2003 | | |
| JP | 2007282358 A | * 10/2007 | ............. | H02K 15/12 |
| JP | 2009-219309 A | 9/2009 | | |
| JP | 2009273308 A | * 11/2009 | | |
| JP | 2014-150626 A | 8/2014 | | |
| JP | 2014-236592 A | 12/2014 | | |
| JP | 2017-163757 A | 9/2017 | | |
| JP | 2017163757 A | * 9/2017 | | |

OTHER PUBLICATIONS

Nov. 2, 2021, Chinese Office Action issued for CN application No. 201911256113.7.
Apr. 22, 2022, Chinese Office Action issued for related CN Application No. 201911256113.7.
Aug. 9, 2022, Japanese Office Action issued for related JP Application No. 2018-235324.
Jul. 4, 2022, Chinese Office Action issued for related CN Application No. 201911256113.7.

* cited by examiner

ROTOR AND ROTOR MANUFACTURING METHOD

CROSS REFERENCE TO PRIOR APPLICATION

This application claims priority to Japanese Patent Application No. 2018-235324 (filed on Dec. 17, 2018), which is hereby incorporated by reference in its entirety.

BACKGROUND

Technical Field

The present invention relates to a rotor and a rotor manufacturing method.

Related Art

For example, in a motor which is used in an automobile electric steering apparatus, motor torque pulsations are a primary cause of noise and vibration. One primary factor in torque pulsation is cogging torque.

A rotor with a step skew structure is used to reduce cogging torque, as disclosed in JP 2014-236592 A, for example.

The rotor core disclosed in JP 2014-236592 A has a step skew structure formed by laminating iron core material and a plurality of stepped cores, which have a plurality of permanent magnets provided around the iron core material, shifted by an amount corresponding to a skew angle. A rotor is configured by providing a through-hole, into which a rotating shaft is inserted, in the iron core material constituting the rotor core and by inserting the rotating shaft into the through-hole.

In the rotor disclosed in JP 2014-236592 A, a key protruding in a radially inward direction from the inner peripheral surface of the rotor core is provided, and a plurality of key grooves for fixing the rotor core, each corresponding to the respective stepped cores, are provided on the outer peripheral surface of the rotating shaft in positions shifted by an amount corresponding to a skew angle. By laminating the plurality of stepped cores in order so that the key is fitted into the key grooves which correspond to the respective stepped cores of the rotating shaft, a rotor with a step skew structure is formed.

SUMMARY

The foregoing stepped cores can be formed by using adhesive to attach a plurality of permanent magnets around a cylindrical iron core material having a through-hole into which a rotating shaft is inserted, for example. Furthermore, the rotor core can be formed by laminating the plurality of stepped cores and press-fitting the rotating shaft into the through-hole by applying a load in the lamination direction.

The end faces of the stepped cores are not necessarily flat due to dimensional errors of the iron core material and permanent magnets, respectively, rather, the iron core material may protrude further than the permanent magnets, or the permanent magnets may protrude further than the iron core material.

When two stepped cores are laminated and the rotating shaft is press-fitted, same may be arranged and laminated such that end faces at which the permanent magnets of the two stepped cores protrude further than the iron core material, contact one another, for example. There has been a problem in that it is difficult to manufacture the rotor stably because the permanent magnets end up colliding and being damaged upon press-fitting the rotating shaft by applying a load in the lamination direction of the two stepped cores laminated in this state.

In view of the foregoing issue, an object of the present invention is to provide a rotor and a rotor manufacturing method with which it is possible to obtain a rotor of stable quality.

In order to achieve the foregoing object, a rotor according to one embodiment of the present invention includes a drive shaft, a first rotor core unit, and a second rotor core unit.

The first rotor core unit includes a first iron core material having a through-hole into which the drive shaft is inserted, a plurality of first permanent magnets provided on the first iron core material, and a first reference surface at which the first iron core material and first permanent magnets are flush or at which the first iron core material protrudes further than the permanent magnets.

The second rotor core unit includes a second iron core material having a through-hole into which the drive shaft is inserted, a plurality of second permanent magnets arranged on the side of the second iron core material, and a second reference surface at which the second iron core material and second permanent magnets are flush or at which the second iron core material protrudes further than the permanent magnets, the second rotor core unit being laminated in an axial direction on the first rotor core unit such that the first reference surface and the second reference surface contact each other, and being positioned shifted through a predetermined angle in the rotation direction of the drive shaft from the first rotor core unit.

In order to achieve the foregoing object, a rotor manufacturing method according to one embodiment of the present invention includes forming an iron core material by laminating a plurality of rotor plates having a through-hole into which a drive shaft is inserted; attaching permanent magnets to the iron core material to form a rotor core unit having a reference surface at which the iron core material and the permanent magnets are flush or at which the iron core material protrudes further than the permanent magnets; and placing two of the rotor core units in an axial direction such that the reference surfaces thereof lie opposite each other, shifted in a circumferential direction, causing the reference surfaces of the two rotor core units to abut each other, and press-fitting the drive shaft into the through-hole by applying a load to the two rotor core units.

DETAILED DESCRIPTION

An embodiment of the present invention will be described hereinbelow with reference to the drawings.

A rotating electrical device 100 which includes a rotor according to one embodiment of the present invention is used as an automobile electric steering apparatus, for example, and is configured as a motor which applies a steering auxiliary force to a steering shaft.

<Configuration of Rotating Electrical Device>

Figure 1:
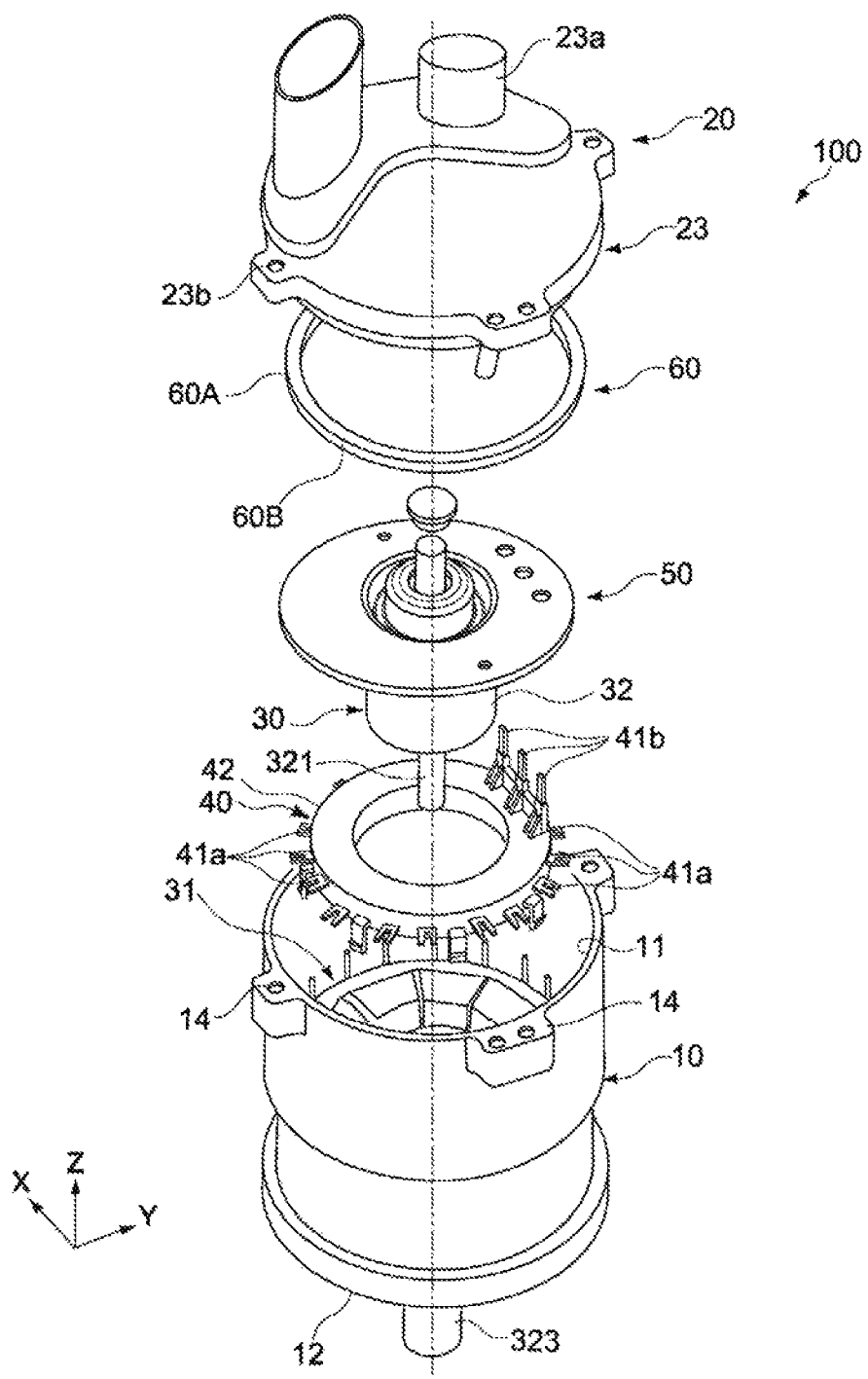
FIG. 1 is an exploded perspective view illustrating a configuration example of a rotating electrical device in which a rotor according to an embodiment of the present invention is installed.
Figure 2:
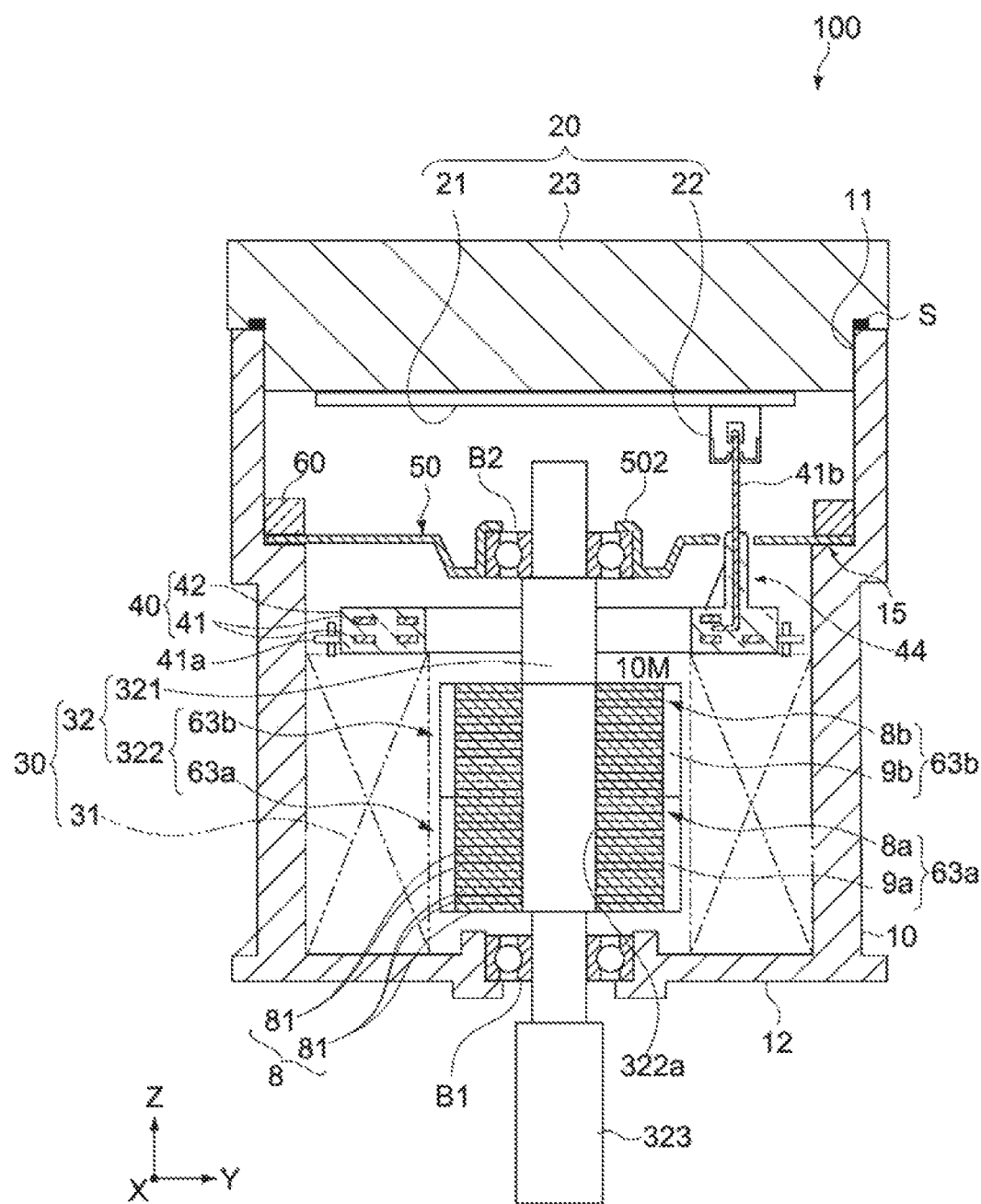
FIG. 2 is an essential part cross-sectional view of the rotating electrical device.

FIG. 1 is an exploded perspective view illustrating a configuration example of rotating electrical device 100 according to one embodiment of the present invention, and FIG. 2 is an essential part cross-sectional view of rotating electrical device 100.

The rotating electrical device 100 has a casing 10, a component package 20, a motor 30, a busbar unit 40, a bearing holder 50, and a press-fit ring 60.

[Casing]

The casing 10 is formed with a cylinder-shaped (cylindrical) outline having an opening 11 and a bottom portion 12 opposite the opening 11. The casing 10 is typically configured from a metal material such as aluminum die-cast or aluminum, and, as illustrated in FIG. 2, accommodates the motor 30, the busbar unit 40, and the like.

A step portion 15 for supporting the perimeter of the bearing holder 50 which is inserted via the opening 11, is formed between the bottom portion 12 and opening 11 (see FIG. 2). The casing 10 is provided between the bottom portion 12 and step portion 15 and has a motor chamber 10M (see FIG. 2) for accommodating the rotor 32, described subsequently.

[Component Package]

As illustrated in FIG. 2, the component package 20 is held at the top end of the casing 10 above the motor 30, busbar unit 40, and bearing holder 50. The component package 20 has a component mounting substrate 21 and a heat sink 23.

The component mounting substrate 21 of the present embodiment is a circuit board which includes various electronic devices (not illustrated) constituting an electronic control unit (ECU) of an electric power steering (EPS) apparatus. The electronic devices include a central processing unit (CPU), a memory, and the like. The component mounting substrate 21 is fixed to a heat sink (lid portion) 23 via a plurality of screw portions (not illustrated).

The heat sink 23 constitutes a lid portion which hermetically seals the interior of the casing 10 by being fitted to the opening 11 in the casing 10 via a seal ring S (see FIG. 2). As illustrated in FIG. 1, an external connection terminal 23a, which electrically interconnects the component mounting substrate 21 and a power-supply unit which is not illustrated, is provided on the upper face of the heat sink 23. The perimeter of the heat sink 23 is provided with a plurality of brackets 23b having a screw insertion hole, and is fastened with screws to a plurality of fixing brackets 14 provided on the perimeter of the opening 11 in the heat sink 23 via the brackets 23b.

[Motor]

The motor 30 is accommodated in the motor chamber 10M in the casing 10 as illustrated in FIG. 2 and has a stator 31 and a rotor 32.

The stator 31 includes a plurality of teeth (stator cores) which are arranged in an annular shape inside the casing 10 and coils (stator coils) which are wound around each of the plurality of teeth. The teeth are formed of a magnetic material and configured from a laminated body of a plurality of magnetic, rigid plates, for example. The stator 31 is fixed to the casing 10 by being fitted to the inner circumference of the casing 10. To form three-phase magnetic coils with a U phase, V phase and W phase, both ends (not illustrated) of the coils are electrically connected to the busbar unit 40.

The rotor 32 has a drive shaft (rotating shaft) 321 which rotates about an axis (Z axis), and a rotor core 322 which is attached to the drive shaft 321. The drive shaft 321 is disposed along the axial center of the casing 10 and press-fitted into a through-hole formed in the center of the rotor core 322. The drive shaft 321 is rotatably supported in the casing 10 via a bearing B1 (first bearing) and a bearing B2 (second bearing). The rotor core 322 has a plurality of magnetic poles arranged in a circumferential direction. The rotor 32 is disposed inside the stator 31 and causes the drive shaft 321 to rotate on its axis under electromagnetic action with the stator 31.

The detailed configuration of the rotor 32 will be described subsequently.

One end (the lower end in FIGS. 1 and 2) of the drive shaft 321 passes through the bottom portion 12 of the casing 10 and has a gear portion 323 at its tip. The gear portion 323 meshes with a mating gear (not illustrated) linked to the steering shaft and transmits the rotation of the drive shaft 321 to the steering shaft.

One bearing B1 (first bearing) is attached to the bottom portion 12 of the casing 10 and rotatably supports one end of the drive shaft 321. The other bearing B2 (second bearing) rotatably supports the other end of the drive shaft 321.

The bearing B2 is disposed between the rotor core 322 and the heat sink 23 and is fixed to the casing 10 via the bearing holder 50. The bearing holder 50 will be described in detail subsequently.

[Busbar Unit]

The busbar unit 40 has a plurality of busbars 41 formed of a conductive material and an electrically insulated busbar holder 42 which encloses the busbars 41 (see FIG. 2). The busbar holder 42 is configured from an annular molded body, and the plurality of busbars 41 include a plurality of connecting terminals 41a which protrude radially outward from the outer peripheral surface of the busbar holder 42, and a plurality of power supply terminals 41b which extend in an axial direction from the upper surface of the busbar holder 42 and which correspond to a U phase, V phase, and W phase, respectively (see FIG. 1).

The busbar unit 40 is disposed inside the casing 10 and is connected to the stator coils concentrically with the drive shaft 321. The plurality of connecting terminals 41a are electrically connected to one end of the U-phase, V-phase and W-phase stator coils, respectively, and the plurality of power supply terminals 41b are electrically connected to a connector component 22 on the component mounting substrate 21 which is fixed to the heat sink 23 (see FIG. 2).

[Press-Fit Ring]

The press-fit ring 60 is annular, as illustrated in FIG. 1. The press-fit ring 60 is press-fit via the opening 11 into the casing 10 so as to sandwich the bearing holder 50 in the Z axis direction in conjunction with the step portion 15. The press-fit ring 60 has an outer peripheral surface 60A which is press-fit to the inner peripheral surface of the opening 11, and a second support face 60B which abuts the perimeter of the bearing holder 50.

The press-fit ring 60 is formed of the same material as the casing 10 (aluminum die-cast or aluminum, or the like) or a material with a linear expansion coefficient on the order of the casing 10 (brass or a magnesium alloy, for example).

[Bearing Holder]

The bearing holder 50 serves to align and hold bearing B2 within the casing 10, and is configured from a metallic-plate press-molded body. The bearing holder 50 according to the present embodiment is manufactured by deep-drawing and bending a metallic plate into a solid body shape.

The bearing holder 50 is roughly disc-shaped, and provided in the center thereof is an axial hole through which the drive shaft 321 passes. A bearing holding portion 502 for press-fitting and holding the second bearing B2 is provided in order to enclose the axial hole.

The bearing holding portion 502 integrally holds the bearing B2 by means of a joining or fitting action with the outer race of the bearing B2. Here, an integral join with bearing B2 may also be obtained by caulking the open lower end portion of the bearing holding portion 502.

The bearing holder 50 may be configured from a magnetic material or may be configured from a nonmagnetic material. As a result of the bearing holder 50 being configured from a magnetic material, a shielding effect whereby the electronic component on the component mounting substrate 21 is protected from the effects of an electromagnetic field generated by the stator 31 and the rotor 32 is obtained. Such materials include SPCC (steel plate cold commercial), for example, but obviously is not limited to or by SPCC.

[Rotor Detailed Configuration]

Figure 3:
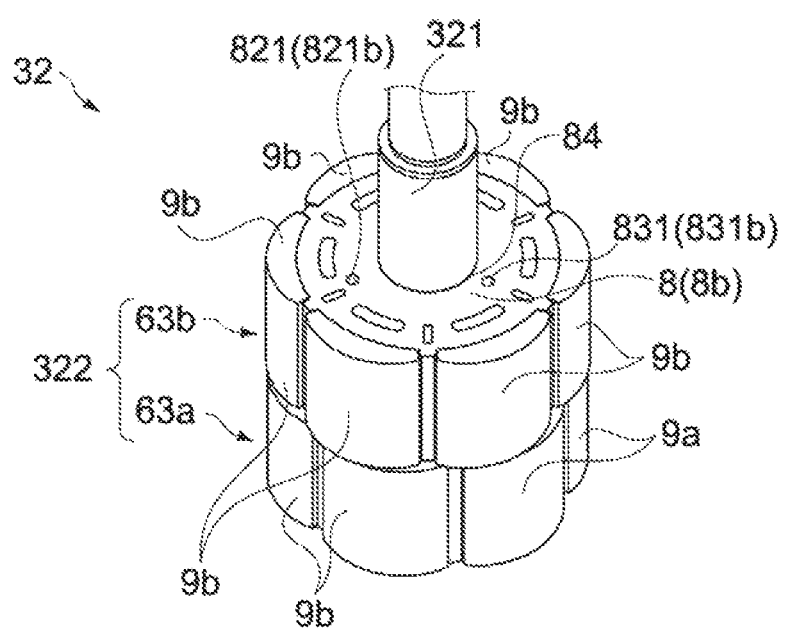
FIG. 3 is a perspective view of the rotor according to an embodiment of the present invention.
Figure 4:
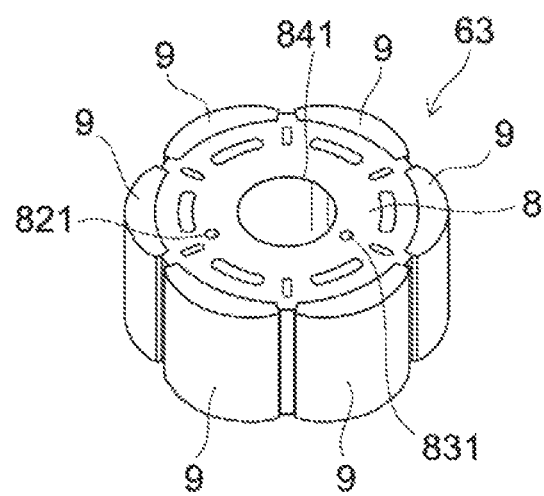
FIG. 4 is a perspective view of a rotor core unit constituting the rotor.

FIG. 3 is a perspective view of the rotor 32. FIG. 4 is a perspective view of a rotor core unit 63 constituting the rotor 32. The rotor 32 of the present embodiment is a rotor with a step skew structure. The rotor 32 is configured by laminating a plurality of independent rotor core units 63 which are shifted through predetermined angles in the circumferential direction.

As illustrated in FIGS. 2 and 3, the rotor 32 has a drive shaft 321 and a rotor core 322. An insertion hole 322a through which the drive shaft 321 passes is provided in the center of an approximately cylindrical rotor core 322.

The rotor core 322 is configured by laminating a plurality, two in the present embodiment, of independent rotor core units 63. In the present embodiment, a rotor core unit 63 which is positioned on a lower level is called the lower rotor core unit 63a, and a rotor core unit 63 which is positioned on an upper level is called the upper rotor core unit 63b.

The lower rotor core unit 63a, which constitutes a first rotor core unit, has an aspect obtained by rotating (or inverting), in a vertically opposing direction, the upper rotor core unit 63b, which constitutes a second rotor core unit. Otherwise, when the lower rotor core unit 63a and upper rotor core unit 63b have the same configuration and there is no particular need to describe the upper and lower rotor core units distinctly, same are sometimes simply referred to as the rotor core units 63.

In addition, when the iron core material 8 and permanent magnets 9 constituting the rotor core units 63 are similar and the upper and lower rotor core units are described distinctly, the first iron core material is called lower iron core material 8a, the second iron core material is called upper iron core material 8b, the first permanent magnet is called lower permanent magnet 9a, and the second permanent magnet is called upper permanent magnet 9b, but when there is no particular need for such distinction, same may be called the iron core material 8 and permanent magnets 9.

Figure 8:
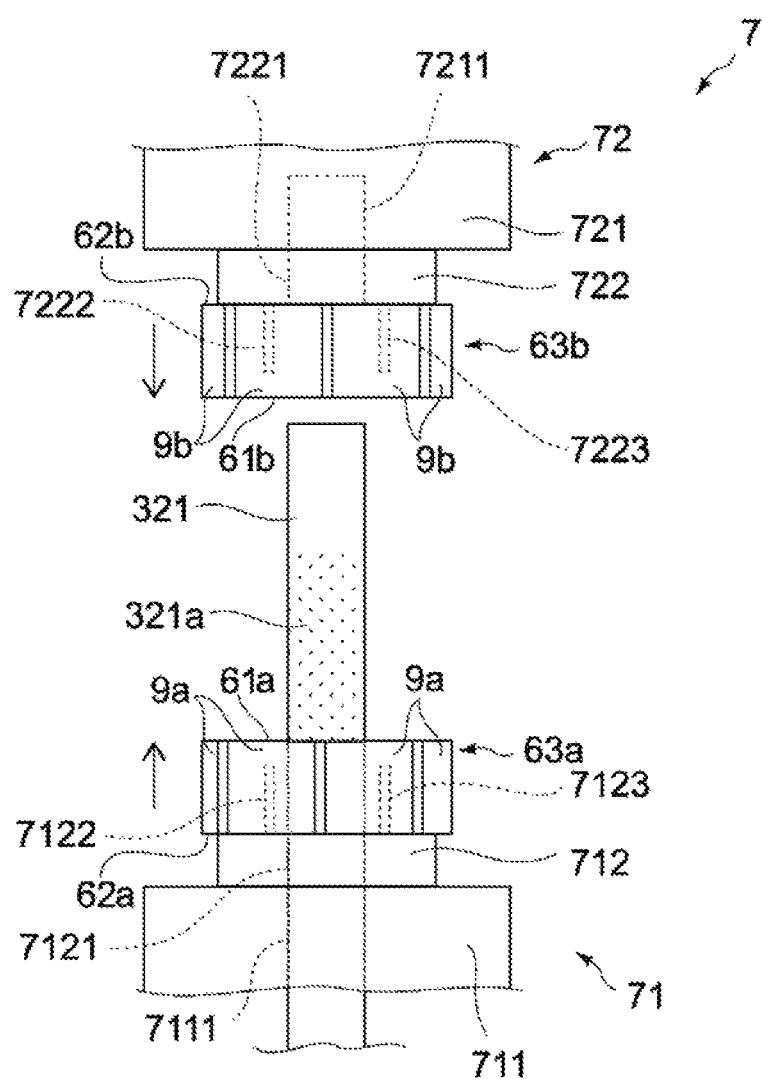
FIG. 8 is a schematic cross-sectional view of a press fitting apparatus which is a view serving to illustrate a step of press-fitting a drive shaft in manufacturing the rotor core.

The rotor core units 63 have a roughly cylindrical shape, and include a reference surface 61, and an opposite surface 62 which lies opposite the reference surface 61 (see FIG. 8, for example).

The details will be described subsequently, but, in the present embodiment, in a rotor manufacturing method which will be described subsequently, the side of a jig 200, described subsequently, which contacts a working surface 201, serves as a reference surface during the assembly process of the rotor core units 63.

The lower rotor core unit 63a and upper rotor core unit 63b are laminated such that the reference surfaces 61 thereof abut each other. The lower rotor core unit 63a is disposed shifted, relative to the upper rotor core unit 63b, through a predetermined angle (skew angle) in the rotation direction of the drive shaft 321 (in the circumferential direction of the rotor core unit). The cogging torque can accordingly be reduced. Although the foregoing shift is 12 degrees in the present embodiment, the present invention is not limited to or by this shift. The skew angle is suitably configured according to the shape and number of permanent magnets, and the like.

In the description hereinbelow, a reference sign 61a is sometimes assigned to the reference surface of the lower rotor core unit 63a which constitutes a first reference surface, and a reference sign 61b is sometimes assigned to the reference surface of the upper rotor core unit 63b which constitutes a second reference surface. Furthermore, the opposite surface 62 opposite the reference surface 61 is sometimes described hereinbelow by assigning a reference sign 62a to the opposite surface of the lower rotor core unit 63a and by assigning a reference sign 62b to the opposite surface of the upper rotor core unit 63b.

Figure 5A:
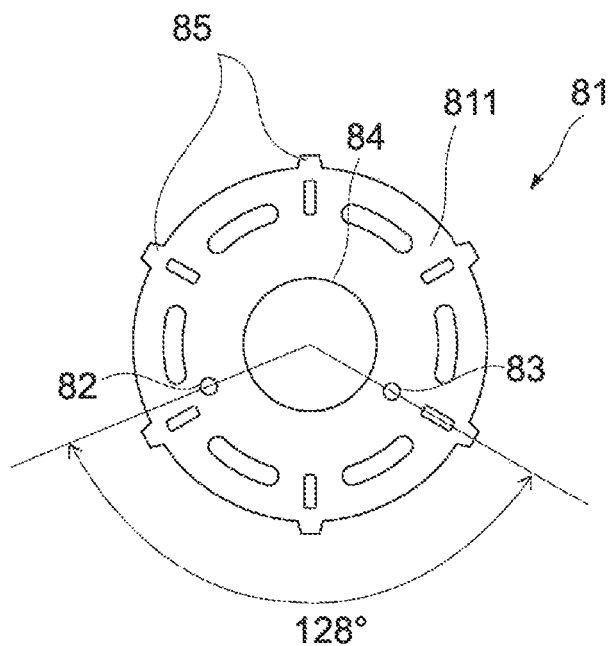
FIGS. 5A and 5B are plan views of a rotor plate constituting an iron core material which constitutes the rotor core unit.

FIG. 5A is a plan view of a steel sheet 81 which is a rotor plate constituting the iron core material 8.

Figure 5B:
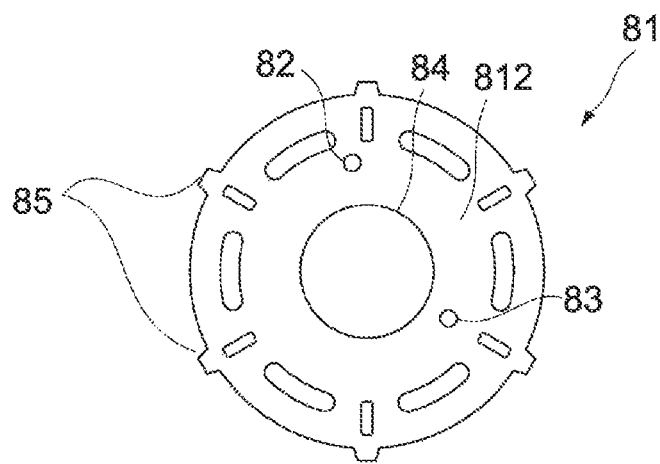

FIG. 5B is a plan view of when the surface and back sides of the steel sheet 81 in FIG. 5A are oriented in opposite directions.

Figure 6:
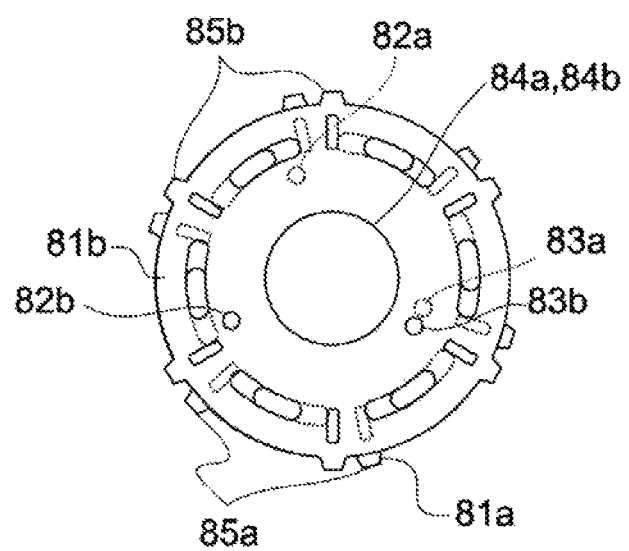
FIG. 6 is a plan view of when two of the rotor plates are stacked together with the surface and back sides thereof oriented in opposite directions.

FIG. 6 is a plan view of when two steel sheets 81 are stacked together with the surface and back sides thereof oriented in opposite directions.

The rotor core units 63 have an iron core material 8 which is fixed to the outer periphery of the drive shaft 321 and rotates together with the drive shaft 321, and a plurality of permanent magnets 9 which are attached at equal intervals around the outer periphery of the iron core material 8. Six permanent magnets 9 are provided in the present embodiment.

The iron core material 8 is configured by laminating a plurality of the steel sheets 81 illustrated in FIG. 5A, as illustrated in FIG. 2.

As illustrated in FIGS. 5A and 5B, the steel sheets 81 have a through-hole 84 in the center of which the drive shaft 321 is inserted, a first alignment hole 82, and a second alignment hole 83. All of the holes have a circular planar shape.

The iron core material 8 is formed by laminating the plurality of steel sheets 81 such that the respective through-holes 84, first alignment holes 82 and second alignment holes 83 are stacked on top of each other.

As a result of laminating the plurality of steel sheets 81, the respective through-holes 84 are contiguous, and the through-hole 841 (see FIG. 4) of the iron core material 8 is formed.

Figure 9:
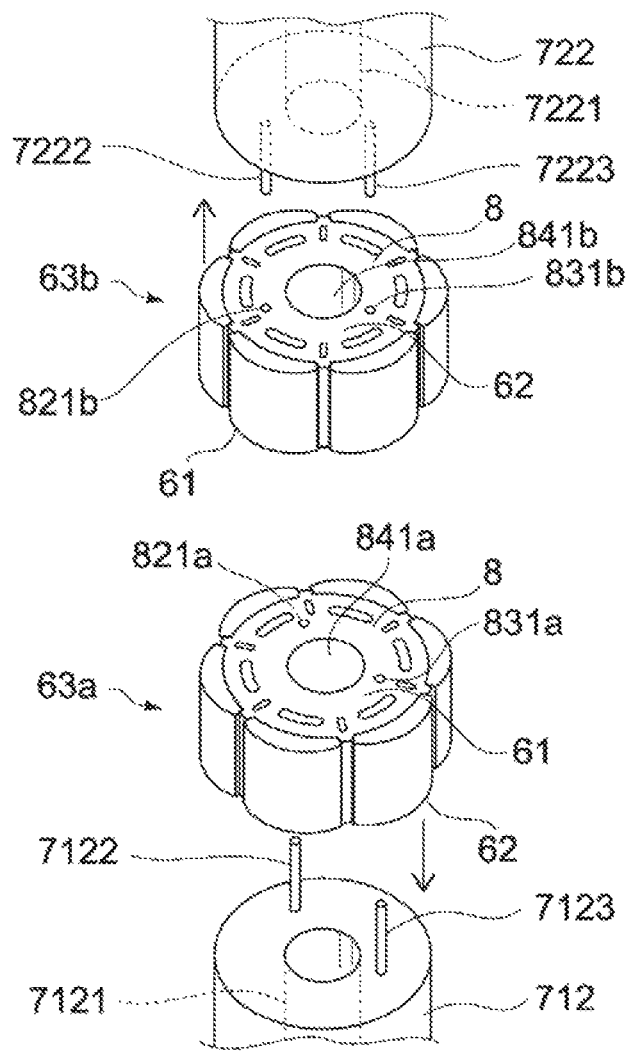
FIG. 9 is a partial perspective view of the press fitting apparatus which is a view serving to illustrate a drive shaft press-fitting step.

A reference sign 841a is assigned to the through-hole provided in the iron core material 8a of the lower rotor core unit 63a, and a reference sign 841b is assigned to the through-hole provided in the iron core material 8b of the upper rotor core unit 63b (see FIG. 9).

Moreover, by laminating the two rotor core units 63a and 63b, the through-holes 841a and 841b of the iron core material 8 of the respective rotor core units 63a and 63b are contiguous, and an insertion hole 322a in which the drive shaft 321 is inserted is formed.

Furthermore, by laminating the plurality of steel sheets 81, the respective first alignment holes 82 are contiguous, and a first alignment hole 821, which passes through the iron core material 8, is formed. Similarly, the respective second alignment holes 83 of the laminated plurality of steel sheets 81 are contiguous, and a second alignment hole 831, which passes through the iron core material 8, is formed (see FIG. 4).

Reference signs 821a and 831a are assigned to the first alignment hole and second alignment hole, respectively, which are provided in the iron core material 8a of the lower rotor core unit 63a. Reference signs 821b and 831b are assigned to the first alignment hole and second alignment hole, respectively, which are provided in the iron core material 8b of the upper rotor core unit 63b (see FIG. 9). Furthermore, when there is no particular need to distinguish between the upper and lower rotor core units, the foregoing alignment holes are sometimes referred to as the first alignment hole 821 and the second alignment hole 831.

As illustrated in FIGS. 5A and 5B, the steel sheets 81 have an approximately circular shape. Six protrusions 85 are provided at equal intervals on the periphery of the steel sheets 81.

When the iron core material 8 is formed by stacking together a plurality of the steel sheets 81, six linear protrusions which extend parallel to the axial direction of the six drive shafts 321 are formed by the protrusions 85 on the side of the cylindrical iron core material 8. Furthermore, permanent magnets 9 are arranged in the gaps formed between the adjacent linear protrusions.

The first alignment hole 82 and second alignment hole 83 both have planar shapes which are circles of the same diameter. In the present embodiment, the first alignment hole 82 and second alignment hole 83 are not positioned on the same circumferences centered on the steel sheet 81, rather, same are located at different distances from the center of the steel sheet 81.

More specifically, the first alignment hole 82 and second alignment hole 83 both have a circular shape with a diameter which is 1.5 mm in size, and the distance between the center of the first alignment hole 82 and the center of the steel sheet 81 is 8 mm, and the distance between the center of the second alignment hole 83 and the center of the steel sheet 81 is 7.75 mm. In addition, an angle of 128° is formed between a straight line joining the center of the steel sheet 81 to the first alignment hole 82 and a straight line joining the center of the steel sheet 81 to the second alignment hole 83. Furthermore, the numerical values of these dimensions are not limited to the numerical values appearing here.

The steel sheet 81 has a first face 811 and a second face 812 which are opposite each other. FIG. 5A is a plan view of when the first face 811 is made the upper surface. FIG. 5B is a plan view of when the second face 812 is made the upper surface.

As illustrated in FIGS. 5A and 5B, even when the steel sheet 81 illustrated in FIG. 5A is reversed, the respective positions of the steel sheet 81, the first alignment hole 82, and the second alignment hole 83 illustrated in FIG. 5B do not coincide with each another.

That is, the first alignment hole 82 and second alignment hole 83 are formed to not have the same shape when the surface and back sides of the steel sheet 81 are oriented in opposite directions. Furthermore, the circular through-hole 84 which is provided in the center of the steel sheets 81 is provided to afford coincidence when two steel sheets 81 are stacked together with the surface and back sides thereof oriented in opposite directions.

A steel sheet 81a is a steel sheet for when the second face 812 illustrated in FIG. 5B is made the upper surface. A steel sheet 81b is a steel sheet for when the first face 811 illustrated in FIG. 5A is made the upper surface.

In the example illustrated in FIG. 6, the steel sheet 81a is located below the steel sheet 81b.

Furthermore, FIG. 6 illustrates the positional relationship, in the rotor 32 illustrated in FIG. 3, between a steel sheet 81 which constitutes the iron core material 8b of the upper rotor core unit 63b and the steel sheet 81 which constitutes the iron core material 8a of the lower rotor core unit 63a. The lower rotor core unit 63a and upper rotor core unit 63b are arranged shifted through a predetermined angle, which is 12° in the present embodiment, in the direction of rotation of the drive shaft 321.

In FIG. 6, the steel sheet 81 constituting iron core material 8b of the upper rotor core unit 63b corresponds to the steel sheet 81b on the upper surface of which the first face 811 is located. The steel sheet 81 constituting iron core material 8a of the lower rotor core unit 63a corresponds to the steel sheet 81a on the upper surface of which the second face 812 is located.

In FIG. 6, reference signs 82b and 83b are assigned to the first and second alignment holes, respectively, in the steel sheet 81b which is disposed on the upper side, and reference signs 82a and 83a are assigned to the first and second alignment holes, respectively, in the steel sheet 81a which is disposed on the lower side.

As illustrated in FIG. 6, when two steel sheets 81 are stacked together with the surface and back sides thereof oriented in opposite directions in a state where the centers coincide, the alignment holes thereof do not simultaneously coincide with each other. In addition, the two alignment holes do not coincide with each other even when one steel sheet 81 is rotated in a circumferential direction.

Accordingly, in the rotor 32 illustrated in FIG. 3, because the lower rotor core unit 63a and upper rotor core unit 63b are arranged positioned vertically opposing each other, the alignment holes 821 and 831 do not coincide with each other.

Six permanent magnets 9 are arranged at equal intervals in the circumferential direction of the iron core material 8. Furthermore, the number of permanent magnets 9 is not limited to this quantity, rather, the rotor core units 63 may have seven or more permanent magnets arranged side by side in a circumferential direction or may have any number, from two to five, of permanent magnets.

The rotor 32 is formed by press-fitting and securing the drive shaft 321 in the insertion hole 322a in the rotor core 322. The surface, of the drive shaft 321, which corresponds to the insertion hole 322a (configuration denoted by the reference sign 321*a* in FIG. 8, described subsequently) is knurled, and the surface has a textured shape. The diameter of the insertion hole 322*a* is slightly smaller than the diameter of the drive shaft 321. The rotor core 322 is fixed to the drive shaft 321 by press-fitting the drive shaft 321 in the insertion hole 322*a*.

The lower rotor core unit 63*a* and upper rotor core unit 63*b* are arranged such that the reference surface 61*a* and reference surface 61*b* abut each other.

The reference surfaces 61 are flat surfaces. Here, flat surfaces also include, in addition to an aspect where the end face of the iron core material 8 and the end faces of the permanent magnets 9 are completely flush, an aspect in which, due to an error during assembly of the rotor core unit 63, the end face of the iron core material 8 protrudes 0.2 mm or less in the axial direction further than the end faces of the permanent magnets 9.

[Rotor Manufacturing Method]

A rotor manufacturing method will be described next.

The rotor 32 is mainly manufactured through a step of assembling the rotor core units 63 and a press-fitting step of press-fitting the drive shaft 321 inside the two laminated rotor core units 63. Each step will be described hereinbelow.

[Rotor Core Unit Assembly Step]

The step of assembling the rotor core units 63 will now be described using FIGS. 7A to 7C.

Figure 7A:
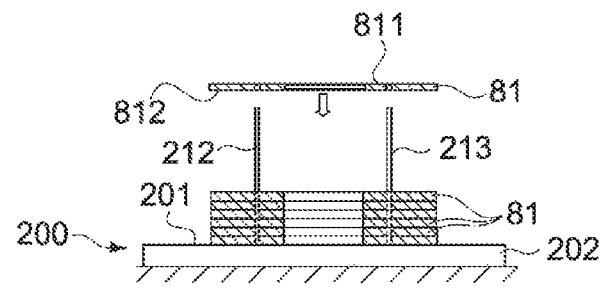
FIGS. 7A to 7C are assembly process views illustrating steps for assembling the rotor core unit.
Figure 7B:
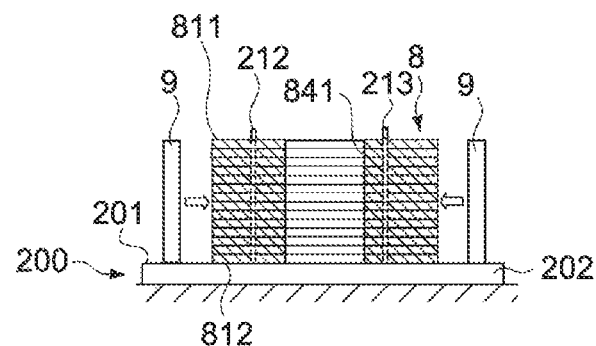
Figure 7C:
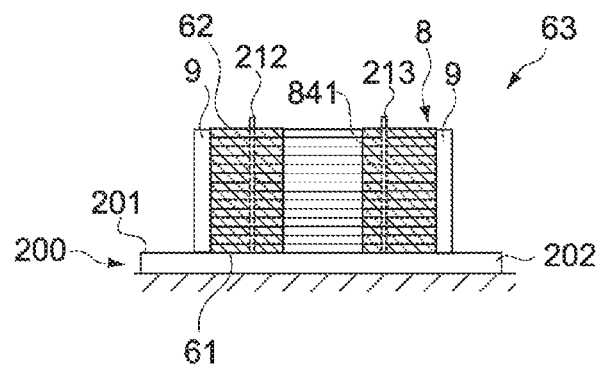

FIGS. 7A to 7C are views of the step of assembling the rotor core units 63.

(Assembly Jig Configuration)

First, an assembly jig 200, illustrated in FIG. 7A, which is used when assembling the rotor core units 63 will be described first.

As illustrated in FIG. 7A, the assembly jig 200 is mounted on a flat surface. The jig 200 is used for alignment so that, when forming the iron core material 8 obtained by laminating a plurality of steel sheets 81, the plurality of steel sheets 81 are not laminated with a skew. Furthermore, the jig 200 is used for alignment so that the respective end faces of the iron core material 8 and permanent magnets 9 are aligned upon fastening the plurality of permanent magnets 9 to the periphery of the iron core material 8.

The jig 200 has a workbench 202 which has a flat working surface 201, and two alignment pins 212 and 213 which are fixed to the workbench 202. The alignment pin 212 is provided to correspond to the alignment hole 82 of the steel sheets 81, and the alignment pin 213 is provided to correspond to the alignment hole 83.

(Description of Assembly Step)

The assembly step will be described next.

As illustrated in FIG. 7A, the steel sheets 81 are mounted on the workbench 202 by passing the corresponding alignment pins 212 and 213 provided in the jig 200 through the alignment holes 82 and 83, respectively, of the steel sheets 81. Accordingly, the steel sheets 81 are mounted such that the first face 811 of the steel sheets 81 is the upper surface, and the second face 812 is positioned on the working surface 201 side.

As illustrated in FIG. 7A, a predetermined number of steel sheets 81 are laminated on the jig 200.

As mentioned earlier, the alignment holes 82 and 83 are provided in the steel sheets 81 so as to not coincide with each other when two steel sheets 81 are stacked together with the surface and back sides thereof oriented in opposite directions. Thus, as illustrated in FIG. 7A, the steel sheets 81 can be laminated reliably, with the first face 811 serving as the upper surface, by placing the steel sheets 81 according to the alignment pins 212 and 213 provided on the jig 200. For example, the steel sheets 81 can be laminated reliably such that the second face 812 is positioned on the working surface 201 side, even when the steel sheets 81 are to be mounted with the surface and back sides thereof oriented in opposite directions, because the alignment pins 212 and 213 cannot pass through the alignment holes 82 and 83.

The iron core material 8 is formed by laminating and stacking a predetermined number of steel sheets 81. The iron core material 8 has a through-hole 841, a first alignment hole 821, and a second alignment hole 831, which each pass through the iron core material 8.

Thereafter, as illustrated in FIG. 7B, the permanent magnets 9 are fastened to the periphery of the iron core material 8 in a state where the iron core material 8 is mounted on the workbench 202. Thereupon, by sticking the permanent magnets 9 to the iron core material 8 so that one end face of the permanent magnets 9 contacts the working surface 201, one end face of the permanent magnets 9 and one end face of the iron core material 8 can be aligned on the same surface.

The rotor core units 63 are thus assembled as illustrated in FIG. 7C. The surface, of the rotor core unit 63, which contacts the working surface 201 is reference surface 61, and the surface opposite the reference surface 61 is opposite surface 62.

The reference surface 61 is a flat surface. Here, flat surfaces also include, in addition to an aspect where the second face 812 of the steel sheet 81 in the lowest position which constitutes the iron core material 8 and one end face of the permanent magnets 9 are completely flush, an aspect in which, due to an error during assembly of the rotor core unit 63, one end face of the iron core material 8 (corresponds here to the second face 812 of the steel sheet 81 in the lowest position which constitutes the iron core material 8 during assembly) protrudes 0.2 mm or less further than the one end face of the permanent magnets 9.

[Driving Shaft Press-Fitting Step]

A drive shaft press-fitting step in which two rotor core units 63, assembled as mentioned earlier, are laminated and the drive shaft 321 is press-fit will be described next using FIGS. 8 and 9.

(Configuration of Press Fitting Apparatus)

First, the configuration of a press fitting apparatus 7 which is employed in the drive shaft press-fitting step will be described.

FIG. 8 is a schematic cross-sectional view of a press fitting apparatus 7 which is a view serving to illustrate a driving shaft press-fitting step. The through-hole 841 and alignment holes 821 and 831 provided in each of the rotor core units 63*a* and 63*b* are omitted from the illustration of FIG. 8 in order to make the drawing clearer.

FIG. 9 is a partial perspective view of the press fitting apparatus 7. FIG. 9 is a diagram illustrating the positional relationships between alignment holes 821*a*, 831*a*, 821*b*, and 831*b* of each of the rotor core units 63*a* and 63*b*, and alignment pins 7122, 7123, 7222, and 7223 provided in each of the support bases 712 and 722.

As illustrated in FIGS. 8 and 9, the press fitting apparatus 7 has a lower support portion 71 constituting a first support portion and an upper support portion 72.

The lower support portion 71 has a lower pedestal 711 and a lower support base 712 constituting a first support base.

The lower pedestal 711 has a larger planar shape than the lower support base 712 and supports the lower support base 712.

The lower support base 712 is installed on the lower pedestal 711. A first alignment support pin 7122 and a second alignment support pin 7123 are provided on the lower support base 712. The lower support base 712 is configured to enable the lower rotor core unit 63a to be installed and mainly supports the iron core material 8a part of the lower rotor core unit 63a.

Insertion holes 7111 and 7121, which are through-holes enabling insertion of the drive shaft 321, are provided in the lower pedestal 711 and lower support base 712, respectively.

The first alignment support pin 7122 and second alignment support pin 7123 which are provided on the lower support base 712 are arranged in positions enabling insertion into the first alignment hole 821a and the second alignment hole 831a, respectively, of the lower rotor core unit 63a on the lower surface of which the opposite surface 62a is located and on the upper surface of which reference surface 61a is located.

The upper support portion 72 has an upper pedestal 721 and an upper support base 722 constituting a second support base.

The upper pedestal 721 has a larger planar shape than the upper support base 722 and supports the upper support base 722.

The upper support base 722 is installed on the upper pedestal 721. A first alignment support pin 7222 and a second alignment support pin 7223 are provided on the upper support base 722. The upper support base 722 is configured to enable the upper rotor core unit 63b to be installed and mainly supports an iron core material 8b part of the upper rotor core unit 63b.

Insertion holes 7211 and 7221, which enable insertion of the drive shaft 321, are provided in the upper pedestal 721 and upper support base 722, respectively. Insertion hole 7221, which is provided in the upper support base 722, is a through-hole, and insertion hole 7211, which is provided in the upper pedestal 721, is an insertion hole with a bottom portion prescribing an insertion limit of the drive shaft 321.

The first alignment support pin 7222 and second alignment support pin 7223 which are provided on the upper support base 722 are arranged in positions enabling insertion into the first alignment hole 821b and the second alignment hole 831b, respectively, of the upper rotor core unit 63b on the upper surface of which the opposite surface 62b is located and on the lower surface of which the reference surface 61b is located.

As illustrated in FIG. 9, the positions of the first and second alignment support pins 7222 and 7223 of the upper support base 722 coincide with the positions of the first and second alignment support pins 7122 and 7123 when the lower support base 712 has been vertically inverted and rotated in a circumferential direction in the drawing.

The upper support base 722 and lower support base 712 are arranged such that the upper rotor core unit 63b and lower rotor core unit 63a are shifted in a circumferential direction through a skew angle.

Thus, by configuring the positions of the first and second alignment support pins 7222 and 7223 on the upper support base 722, the rotor core unit 63b assembled in the foregoing assembly step can be installed on the upper support base 722 by making the opposite surface 62b the upper surface and the reference surface 61b the lower surface.

Likewise, by configuring the positions of the first and second alignment support pins 7122 and 7123 on the lower support base 712 as described earlier, the rotor core unit 63a assembled in the foregoing assembly step can be installed on the lower support base 712 by making the opposite surface 62a the lower surface and the reference surface 61a the upper surface.

As mentioned earlier, by using rotor core units 63 which employ steel sheets 81 having shapes in which the alignment holes 82 and 83 do not coincide when two steel sheets 81 are stacked together with the surface and back sides thereof oriented in opposite directions, and by using a press fitting apparatus 7 which has support bases 712 and 722 in the foregoing configuration, even in the case of rotor core units 63 for which, at first glance, it is hard to identify one reference surface 61 from the other, if the rotor core units 63a and 63b, which enable the insertion of alignment pins into alignment holes, are simply arranged in the press fitting apparatus 7, installation is possible such that the reference surfaces 61 of the upper rotor core unit 63b and lower rotor core unit 63a are reliably arranged opposite each other.

Thus, the rotor core units can be arranged in the press fitting apparatus 7 without confirming the reference surfaces 61, and workability improves. Moreover, because two rotor core units can be laminated such that the reference surfaces 61 thereof reliably lie opposite each other, it is possible to obtain a rotor 32 of a quality which is always stable.

(Description of Press-Fitting Step)

A step of press-fitting the drive shaft 321 which employs the foregoing press fitting apparatus 7 will be described next using FIGS. 8 and 9.

First, as illustrated in FIG. 9, the lower rotor core unit 63a is installed on the lower support base 712 such that the alignment pins 7122 and 7123 are inserted into the respective alignment holes 821a and 831a.

As illustrated in FIGS. 8 and 9, the lower rotor core unit 63a is installed such that reference surface 61a is located on an upper side and the opposite surface 62a is located on a lower side. The through-hole 841a of the lower rotor core unit 63a and the insertion hole 7121 of the lower support base 712 and the insertion hole 7111 of the lower pedestal 711 communicate.

Similarly, the upper rotor core unit 63b is installed on the upper support base 722 such that the alignment pins 7222 and 7223 are inserted into the respective alignment holes 182b and 183b.

The upper rotor core unit 63b is installed such that reference surface 61b is located on a lower side and the opposite surface 62b is located on an upper side. The through-hole 841b of the upper rotor core unit 63b and the insertion hole 7221 of the upper support base 722 and the insertion hole 7211 of the upper pedestal 721 communicate.

Thus, in the press-fitting step, the upper rotor core unit 63b and lower rotor core unit 63a are arranged such that the reference surfaces 61 thereof lie opposite each other.

Thereafter, as illustrated in FIG. 8, the drive shaft 321 is provisionally inserted in the lower rotor core unit 63a. The drive shaft 321 is provisionally inserted as a result of an area below the knurled surface 321a passing through the respective insertion holes in the lower rotor core unit 63a, the lower support base 712, and the lower pedestal 711.

Thereafter, the upper support portion 72 is moved downward and the lower support portion 71 is moved upward, thereby press-fitting the drive shaft 321 into the upper rotor core unit 63b and the lower rotor core unit 63a. A load is applied to the upper rotor core unit 63b and lower rotor core unit 63a during the press fitting of the drive shaft 321.

The drive shaft 321 is press-fit into the upper rotor core unit 63b and lower rotor core unit 63a, thereby forming the rotor 32.

Here, in the assembled rotor core units 63, the opposite surface 62 which lies opposite the reference surface 61 which is a flat surface is designed to be a flat surface, but unevenness can inevitably be generated as a result of intrinsic dimensional errors, or the like, in the iron core material 8 and permanent magnets 9.

Figure 10A:
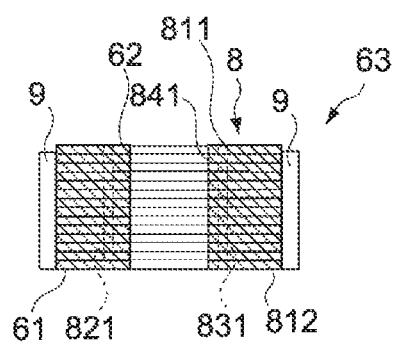
FIGS. 10A and 10B are schematic cross-sectional views of the rotor core unit.
Figure 10B:
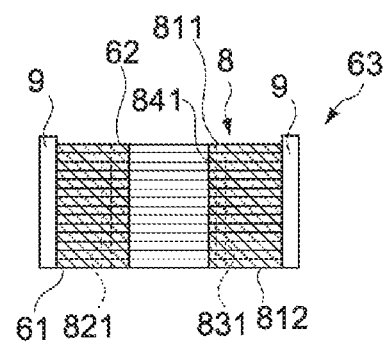

For example, as per the rotor core unit 63 illustrated in FIG. 10A, at the opposite surface 62 which lies opposite the reference surface 61 located on the working surface 201 side of the assembly jig 200 during assembly, the iron core material 8 may protrude further than the other end face of the permanent magnet 9 and, as illustrated in FIG. 10B, the other end face of the permanent magnet 9 may protrude further than the iron core material 8. Thus, unevenness can inevitably be generated in the opposite surface 62 relative to the reference surface 61 which is a flat surface.

The unevenness which is generated in the opposite surface 62 of the rotor core unit 63 is unevenness where the difference between the permanent magnets 9 and iron core material 8 is less than 1 mm, for example, and, at first glance, it is difficult to identify which of the surfaces of the rotor core unit 63 is the reference surface 61.

As described earlier, in the step of press-fitting the drive shaft 321, the drive shaft 321 is press-fit by applying a load in an axial direction to the two laminated rotor core units 63.

Figure 13A:
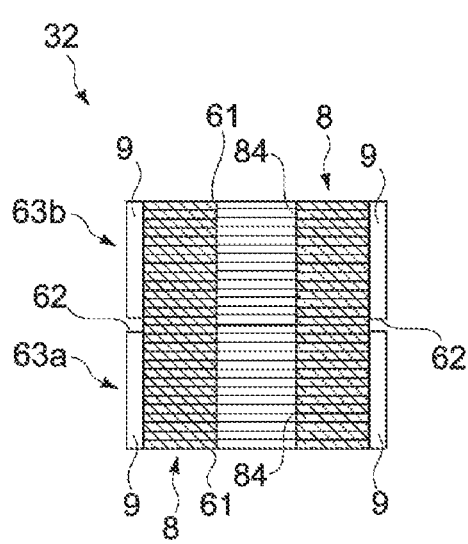
FIGS. 13A and 13B are diagrams to illustrate a method of manufacturing a rotor core which is a comparative example.
Figure 13B:
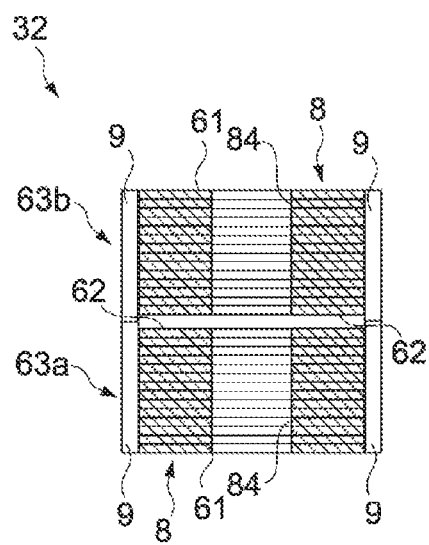

In a case where the rotor 32 is manufactured by using the rotor core unit 63, illustrated in FIG. 10B, in which the permanent magnets 9 protrude further than the iron core material 8 at the opposite surface 62, if the press-fitting step is performed with the opposite surfaces 62 of two rotor core units 63a and 63b arranged opposite each other, as illustrated in FIG. 13B, a load is applied in an axial direction to the two rotor core units 63a and 63b, and the permanent magnets 9 collide with each other. The permanent magnets 9 are formed by fragile, sintered bodies, and hence the permanent magnets 9 are damaged in the press-fitting step.

However, in the present embodiment, because, as described earlier, two rotor core units 63a and 63b are laminated such that the reference surfaces 61 thereof, which are flat surfaces, are reliably arranged opposite each other and abut each other, it is possible to manufacture the rotor 32 stably without the permanent magnets 9 colliding with each other and being damaged.

Figures 11A, 11B:
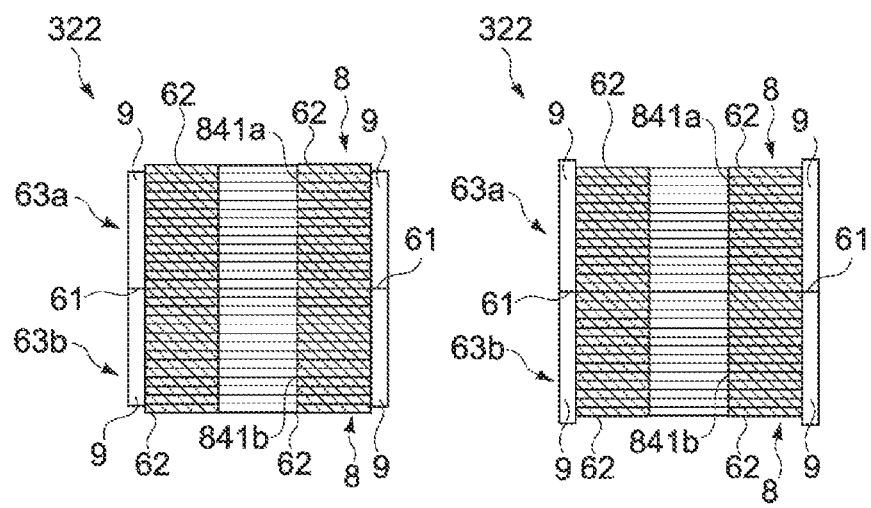
FIGS. 11A and 11B are schematic cross-sectional views of the rotor core.

For example, even when the rotor core units 63a and 63b, which, as illustrated in FIG. 11A, have opposite surfaces 62 at which the iron core material 8 protrudes further than the permanent magnets 9, are laminated, because same are laminated with the reference surfaces 61 thereof, which are flat surfaces, abutting each other, the permanent magnets 9 are not damaged as a result of colliding.

Similarly, even when the rotor core units 63a and 63b, which, as illustrated in FIG. 11B, have opposite surfaces 62 at which the permanent magnets 9 protrude further than the iron core material 8, are laminated, because same are laminated with the reference surfaces 61 thereof, which are flat surfaces, abutting each other, the permanent magnets 9 are not damaged as a result of colliding.

Furthermore, as illustrated in FIG. 13A, if surfaces at which the iron core material 8 protrudes more than the permanent magnet 9 are arranged opposite each other, because the permanent magnets 9 do not collide with each other, damage to the permanent magnets is not generated in the drive shaft press fitting step. In a case where the iron core material 8 protrude further than the permanent magnets 9 and where two rotor core units are laminated by arranging these surfaces opposite each other, a gap is generated between the permanent magnets 9 of the upper rotor core unit 63b and the permanent magnets 9 of the lower rotor core unit 63a. This gap is preferably 0.4 mm or less, for example.

Moreover, in the present embodiment, because the upper rotor core unit 63b and lower rotor core unit 63a, which constitute the rotor 32, can be assembled by means of the same assembly jig 200, there is no need to assemble upper and lower rotor core units by means of separate assembly jigs, and hence workability is favorable.

The rotor 32 of the present embodiment includes a drive shaft 321; a lower rotor core unit (first rotor core unit) 63a which includes a lower iron core material (first iron core material) 8a having a through-hole 841a into which the drive shaft 321 is inserted, a plurality of lower permanent magnets (first permanent magnets) 9a provided on the lower iron core material (first iron core material) 8a, and a first reference surface 61a at which the lower iron core material (first iron core material) 8a and lower permanent magnets (first permanent magnets) 9a are flush or at which the lower iron core material (first iron core material) 8a protrudes further than the lower permanent magnets (first permanent magnets) 9a; and an upper rotor core unit (second rotor core unit) 63b which includes an upper iron core material (second iron core material) 8b having a through-hole 841b into which the drive shaft 321 is inserted, a plurality of upper permanent magnets (second permanent magnets) 9b provided on the upper iron core material (second iron core material) 8b, and a second reference surface 61b at which the upper iron core material (second iron core material) 8b and upper permanent magnets (second permanent magnets) 9b are flush or at which the upper iron core material (second iron core material) 8b protrudes further than the upper permanent magnets (second permanent magnets) 9b, the upper rotor core unit (second rotor core unit) 63b being laminated in the axial direction on the lower rotor core unit (first rotor core unit) 63a such that the first reference surface 61a and second reference surface 61b contact each other, and being positioned shifted through a predetermined angle in the rotation direction of the drive shaft 321 from the lower rotor core unit (first rotor core unit) 63a.

Furthermore, the method of manufacturing the rotor 32 of the present embodiment includes: forming an iron core material 8 by laminating a plurality of steel sheets (rotor plates) 81 having a through-hole 841 into which a drive shaft 321 is inserted; attaching permanent magnets 9 to the iron core material 8 to form a rotor core unit 63 having a reference surface 61 at which the iron core material 8 and the permanent magnets 9 are flush or at which the iron core material 8 protrudes further than the permanent magnets 9; and placing two of the rotor core unit 63 in an axial direction such that the reference surfaces 61 thereof lie opposite each other, shifted in a circumferential direction, causing the reference surfaces 61 of the two rotor core units 63 to abut each other, and press-fitting the drive shaft 321 into the through-hole 841 by applying a load to the two rotor core units 63.

According to the rotor 32 and the method of manufacturing the rotor 32 thus configured, the rotor 32 is formed by way of lamination such that the reference surfaces 61 of the two rotor core units 63 abut each other, and therefore the permanent magnets 9 of each rotor core unit 63 do not collide and are not damaged, thereby enabling a rotor 32 of stable quality to be obtained.

Embodiments of the present invention have been described hereinabove, but it goes without saying that the present invention is not limited to the foregoing embodiments alone, rather, various additional modifications can be made.

For example, although, by way of an example in the foregoing embodiment, the first alignment hole 82 and second alignment hole 83, which are at different distances from the center of the steel sheet 81, are provided as the alignment holes provided in the steel sheets 81, the present invention is not limited to such an example.

The alignment holes may be provided such that the alignment holes do not coincide with each other when two steel sheets are stacked together with the surface and back sides thereof oriented in opposite directions.

Figure 12A:
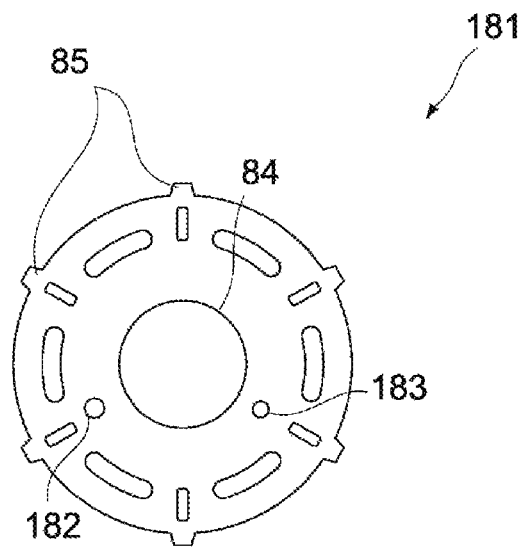
FIGS. 12A and 12B are a plan view of a rotor plate according to another embodiment and a plan view when two of the rotor plates are stacked together with the surface and back sides thereof oriented in opposite directions.
Figure 12B:
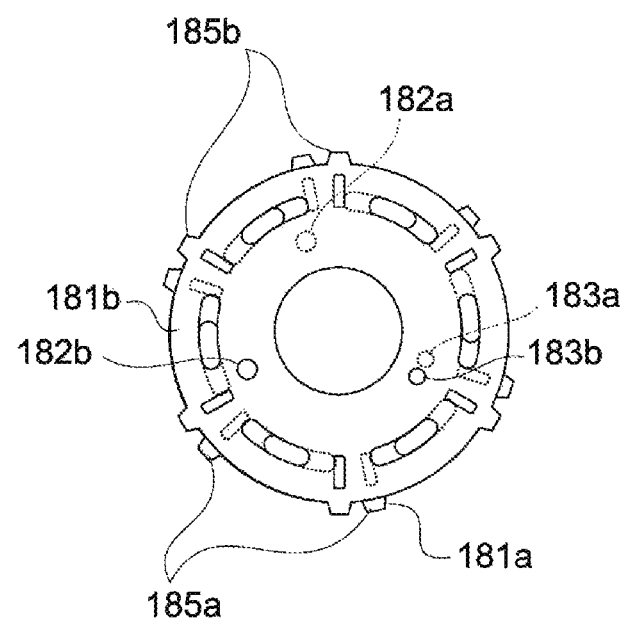

As an example, as per the steel sheet 181 illustrated in FIGS. 12A and 12B, a first alignment hole 182 and a second alignment hole 183, which are circles of different diameters, are provided, and the first alignment hole 182 and second alignment hole 183 may be provided such that there is no point symmetry positional relationship, in which the center of the steel sheets 181 is the center of symmetry, therebetween. In this case, the first alignment hole 182 and second alignment hole 183 may be in positions which are the same distance from the center or may be in different positions.

In this case, different thicknesses may be used for the two alignment pins provided on the assembly jig which is used when assembling the rotor core units and for the two alignment pins provided on each support base used in the press fitting apparatus, respectively.

In addition, as a further example, a first alignment hole and second alignment hole with different shapes may be provided, or the first alignment hole and second alignment hole may be provided such that there is no point symmetry positional relationship, in which the center of the steel sheets is the center of symmetry, therebetween. In this case, the first alignment hole and second alignment hole may be in positions which are the same distance from the center or may be in different positions.

Furthermore, the number of alignment holes is not limited to two, rather, there may be three or more thereof.

Moreover, although the rotating electrical device 100, which is used in a vehicle electric power steering apparatus, has been described as an example of an electronic device in the foregoing embodiments, the present invention is also applicable to rotating electrical devices (motors) for other purposes. In addition, the electronic device according to the present invention can be applied not only to a motor but also to other rotating electrical devices such as generators, and is also applicable to other electronic devices other than rotating electrical devices.

What is claimed is:

1. A rotor, comprising:
  a drive shaft;
  a first rotor core unit which includes a first iron core material having a through-hole into which the drive shaft is inserted;
  a plurality of first permanent magnets provided on the first iron core material;
  a first reference surface at which the first iron core material and first permanent magnets are flush;
  a second rotor core unit which includes a second iron core material having a through-hole into which the drive shaft is inserted;
  a plurality of second permanent magnets arranged on a side of the second iron core material; and
  a second reference surface at which the second iron core material and second permanent magnets are flush,
  the second rotor core unit being laminated in an axial direction on the first rotor core unit such that the first reference surface and the second reference surface contact each other, and being positioned shifted by a predetermined angle in the rotation direction of the first rotor core unit and the drive shaft;
  wherein the first iron core material and the second iron core material are each configured by laminating a plurality of rotor plates of a same shape,
  wherein the rotor plates have alignment holes, and the alignment holes do not coincide with each other when the rotor plates are stacked together with the surface and back sides of the rotor plate oriented in opposite directions, and
  wherein the alignment holes do not coincide with each other when the first rotor core unit and the second rotor core unit are laminated in an axial direction such that the first reference surface and the second reference surface contact each other.

2. The rotor according to claim 1,
  wherein the rotor plates have, as the alignment holes, a first alignment hole and a second alignment hole which are located in positions at different distances from the center of the rotor plates.

3. The rotor according to claim 1,
  wherein the rotor plates have, as the alignment holes, a first alignment hole and a second alignment hole which are of different sizes, and
  wherein the first alignment hole and the second alignment hole are not in a point symmetry positional relationship in which the center of the rotor plate is the center of symmetry.

4. A rotor manufacturing method, comprising:
  forming an iron core material by laminating a plurality of rotor plates of a same shape in a same direction on a flat working surface, the rotor plates having a through-hole into which a drive shaft is inserted, and having alignment holes that do not coincide with each other when the rotor plates are stacked together with the surface and back sides of the rotor plate oriented in opposite directions;
  attaching permanent magnets to the iron core material in a state where the iron core material is mounted on the working surface to form a rotor core unit having a reference surface at which the iron core material and the permanent magnets are flush and which contacts the working surface; and
  placing two of the rotor core units in an axial direction such that the reference surfaces of the rotor core units lie opposite each other, shifted in a circumferential direction, and causing the reference surfaces of the two rotor core units to abut each other.

* * * * *